US008784945B2

(12) United States Patent
Rangwalla

(10) Patent No.: US 8,784,945 B2
(45) Date of Patent: Jul. 22, 2014

(54) MATERIALS TREATABLE BY PARTICLE BEAM PROCESSING APPARATUS AND METHODS OF MAKING THE SAME

(75) Inventor: Imtiaz Rangwalla, Andover, MA (US)

(73) Assignee: Energy Sciences, Inc., Wilmington, MA (US)

(*) Notice: Subject to any disclaimer, the term of this patent is extended or adjusted under 35 U.S.C. 154(b) by 51 days.

(21) Appl. No.: 12/249,231

(22) Filed: Oct. 10, 2008

(65) Prior Publication Data

US 2009/0035479 A1 Feb. 5, 2009

Related U.S. Application Data

(63) Continuation of application No. 10/823,920, filed on Apr. 14, 2004, now Pat. No. 7,449,232.

(51) Int. Cl.
*C08F 2/54* (2006.01)

(52) U.S. Cl.
USPC ........ 427/504; 427/407.1; 427/500; 427/505; 427/552

(58) Field of Classification Search
USPC .............. 427/504, 487, 496, 500, 505, 407.1, 427/551, 552
See application file for complete search history.

(56) References Cited

U.S. PATENT DOCUMENTS

| | | | | |
|---|---|---|---|---|
| 4,113,895 A | | 9/1978 | Watt et al. | |
| 4,246,297 A | | 1/1981 | Nablo et al. | |
| 4,286,008 A | | 8/1981 | Reed et al. | |
| 4,352,672 A | * | 10/1982 | Spiess et al. | 8/444 |
| 4,699,835 A | * | 10/1987 | Takeuchi et al. | 428/848.1 |
| 4,751,273 A | | 6/1988 | Lapin et al. | |
| 5,120,972 A | | 6/1992 | Rangwalla et al. | |
| 5,382,282 A | | 1/1995 | Pennaz | |
| 5,662,985 A | | 9/1997 | Jensen et al. | |
| 5,853,861 A | * | 12/1998 | Held | 428/207 |
| 5,854,300 A | * | 12/1998 | Gould et al. | 522/85 |
| 5,962,995 A | | 10/1999 | Avnery | |
| 6,103,352 A | | 8/2000 | Takahashi | |
| 6,426,507 B1 | | 7/2002 | Rangwalla et al. | |

(Continued)

FOREIGN PATENT DOCUMENTS

| | | |
|---|---|---|
| EP | 1 038 665 | 9/2000 |
| EP | 1 052 116 | 11/2000 |

(Continued)

OTHER PUBLICATIONS

Response After Final filed Oct. 11, 2001 in U.S. Appl. No. 09/264,074.

(Continued)

*Primary Examiner* — Elena T Lightfoot
(74) *Attorney, Agent, or Firm* — Finnegan, Henderson, Farabow, Garrett & Dunner, LLP

(57) ABSTRACT

The present invention is directed to methods for making materials treatable by electron beam (EB) processing, such as materials for flexible packaging, comprising: providing a substrate; applying an ink formulation on at least a portion of the substrate, the ink formulation comprising ink and at least one monomer selected from acrylates, vinyl ethers, cycloaliphatic diepoxides, and polyols; and applying a lacquer on at least a portion of the ink formulation, the lacquer comprising at least one monomer selected from acrylates, vinyl ethers, cycloaliphatic diepoxides, and polyols. The processing apparatus for EB treating the material operates at a low voltage, such as 110 kVolts or below.

17 Claims, 2 Drawing Sheets

(56) References Cited

U.S. PATENT DOCUMENTS

| | | | | |
|---|---|---|---|---|
| 6,528,127 | B1 * | 3/2003 | Edlein et al. | 427/494 |
| 6,610,376 | B1 | 8/2003 | Rangwalla et al. | |
| 7,063,882 | B2 * | 6/2006 | Mossbrook et al. | 428/203 |
| 7,115,218 | B2 * | 10/2006 | Kydd et al. | 252/512 |
| 2002/0119295 | A1 | 8/2002 | Speer et al. | |
| 2003/0001108 | A1 | 1/2003 | Rangwalla et al. | |
| 2003/0207121 | A1 | 11/2003 | McGee | |
| 2003/0235659 | A1 | 12/2003 | Rangwalla et al. | |
| 2004/0089820 | A1 | 5/2004 | Rangwalla et al. | |
| 2011/0038650 | A1 * | 2/2011 | Kaneko et al. | 399/159 |

FOREIGN PATENT DOCUMENTS

| | | |
|---|---|---|
| JP | 53-67517 | 6/1978 |
| JP | 03-060772 | 3/1991 |
| JP | 10-67085 | 3/1998 |
| JP | 2003-535721 | 12/2003 |
| JP | 2004-175449 | 6/2004 |
| WO | WO 02/051915 A2 | 7/2002 |

OTHER PUBLICATIONS

Notice of Allowance mailed Oct. 11, 2002 for U.S. Appl. No. 09/264,074.

Energy Sciences, Inc., Urs V. Lauppi, Treating Thin Layers with Electrons, Apr. 1998.

Energy Sciences, Inc., Urs V. Lauppi, Curing of Thin Coatings with Electrons, UCB Radcure Symposium, Sep. 16-18, 1998, Garmisch-Partenkirchen, Germany.

Energy Sciences, Inc., P. Michael Fletcher, Low Voltage (120 kV) Electron Beam Systems, Feb. 1994.

EP Patent No. 1735166 (from EP Application No. 05756317.3), Communication pursuant to Article 94(3) EPC dated Feb. 19, 2008, and pending claims.

Webster's II New College Dictionary, (3rd ed. 2005).

International Search Report for PCT/US2005/012603 dated Aug. 11, 2005.

Office Action/RR mailed Jan. 12, 2006, in U.S. Appl. No. 10/823,920, filed Apr. 14, 2004.

Office Action mailed Aug. 25, 2006, in U.S. Appl. No. 10/823,920, filed Apr. 14, 2004.

Advisory Action mailed Dec. 21, 2006, in U.S. Appl. No. 10/823,920, filed Apr. 14, 2004.

Pre-Brief Appeal Conference Decision mailed Mar. 9, 2007, in U.S. Appl. No. 10/823,920, filed Apr. 14, 2004.

Office Action mailed Jan. 11, 2008, in U.S. Appl. No. 10/823,920, filed Apr. 14, 2004.

Notice of Allowance mailed 07/10/08, in U.S. Appl. No. 10/823,920, filed Apr. 14, 2004.

U.S. Environmental Protection Agency, Office of Air Quality Planning and Standards, Technical Bulletin, "Ultraviolet and Electron Beam (UV/EB) Cured Coatings, Inks and Adhesives", EPA 456/K-01-001, Jul. 2001.

* cited by examiner

MATERIALS TREATABLE BY PARTICLE BEAM PROCESSING APPARATUS AND METHODS OF MAKING THE SAME

This application is a continuation of U.S. patent application Ser. No. 10/823,920, filed Apr. 14, 2004 now U.S. Pat. No. 7,449,232, which is incorporated herein by reference in its entirety for all purposes.

FIELD OF THE INVENTION

This invention relates to layered materials treatable with a particle beam processing apparatus. The layered materials can be useful for flexible packaging applications.

BACKGROUND OF THE INVENTION

A particle beam processing device is commonly used to expose a substrate or coating to highly accelerated particle beams, such as an electron beam (EB), to cause a chemical reaction, such as a polymerization, on the substrate or coating.

In EB processing, energetic electrons can be used to modify the molecular structure of a wide variety of products and materials. Electrons can be used, for example, to alter specially designed liquid coatings, inks and adhesives. For example, during EB processing, electrons break bonds and form charged particles and free radicals, which can cause polymerization to occur.

Liquid coatings treated with EB processing may include printing inks, varnishes, silicone release coatings, primer coatings, pressure sensitive adhesives, barrier coatings and laminating adhesives. EB processing may also be used to alter and/or enhance the physical characteristics of solid materials such as paper, substrates and non-woven textile substrates, all specially designed to react to EB treatment.

A particle beam processing device generally includes three zones, i.e., a vacuum chamber zone where a particle beam is generated, a particle accelerator zone, and a processing zone. In the vacuum chamber, a tungsten filament(s) is heated to, for example, about 2400K, which is the thermionic emission temperature of tungsten, to create a cloud of electrons. A positive voltage differential is then applied to the vacuum chamber to extract and simultaneously accelerate these electrons. Thereafter, the electrons pass through a thin foil and enter the processing zone. The thin foil functions as a barrier between the vacuum chamber and the processing zone. Accelerated electrons exit the vacuum chamber through the thin foil and enter the processing zone, which is usually at atmospheric conditions.

Electron beam processing devices that are commercially available at the present time generally operate at a minimum voltage of approximately 125 kVolts. Additionally, U.S. Patent Publication No. 2003/0001108, the disclosure of which is incorporated by reference herein, describes an EB unit that operates at lower voltages, such as 110 kV or lower. Materials that can be treated with this lower voltage electron beam equipment (110 kV or lower) include coatings, inks, and laminating adhesives for flexible food packaging.

One challenge facing those using electron beam processing for curing either overprint varnishes or laminating adhesives on conventional solvent or water-based inks is ink adhesion. Either the overprint varnish or the adhesive has little or no wettability or adhesion to the ink, or the ink itself lacks cohesiveness and can split or delaminate from the base film upon applying any force such as experienced during a standard T-peel test or tape adhesion test.

Accordingly, there exists a need to continue developing materials that can be treated with EB processing.

SUMMARY OF THE INVENTION

One embodiment of the present invention provides a layered material, e.g., a material having two or more layers. The material can be curable by exposure to highly accelerated particles, such as an electron beam. Further, the layered material can comprise:

a substrate;

an ink formulation on at least a portion of the substrate, the ink formulation comprising ink and at least one monomer curable by free radical and/or cationic polymerization; and a lacquer on at least a portion of the ink formulation, the lacquer comprising at least one monomer curable by free radical and/or cationic polymerization.

Another embodiment of the present invention provides a layered material, comprising:

a substrate;

an ink formulation on at least a portion of the substrate, the ink formulation comprising ink and at least one monomer selected from acrylate esters, vinyl ethers, cycloaliphatic diepoxides, and polyols; and a lacquer on at least a portion of the ink formulation, the lacquer comprising at least one monomer selected from acrylate esters, vinyl ethers, cycloaliphatic diepoxides, and polyols.

Another embodiment of the present invention provides a layered material, comprising:

a substrate;

an ink formulation on at least a portion of the substrate, the ink formulation comprising ink and at least one polymer derived from at least one monomer selected from acrylate esters, vinyl ethers, cycloaliphatic diepoxides, and polyols; and a lacquer on at least a portion of the ink formulation, the lacquer comprising at least one polymer derived from at least one monomer selected from acrylate esters, vinyl ethers, cycloaliphatic diepoxides, and polyols.

Another embodiment of the present invention provides a layered material, comprising:

a substrate;

an ink formulation on at least a portion of the substrate, the ink formulation comprising ink and at least one first polymer; and a lacquer on at least a portion of the ink formulation, the lacquer comprising at least one second polymer, wherein at least a portion of the at least one first polymer is bonded to at least a portion of the at least one second polymer.

Another embodiment of the present invention provides a method for making a layered material, comprising:

providing a substrate;

applying an ink formulation on at least a portion of the substrate, the ink formulation comprising ink and at least one monomer selected from acrylate esters, vinyl ethers, cycloaliphatic diepoxides, and polyols; and applying a lacquer on at least a portion of the ink formulation, the lacquer comprising at least one monomer selected from acrylate esters, vinyl ethers, cycloaliphatic diepoxides, and polyols.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Figure 1:
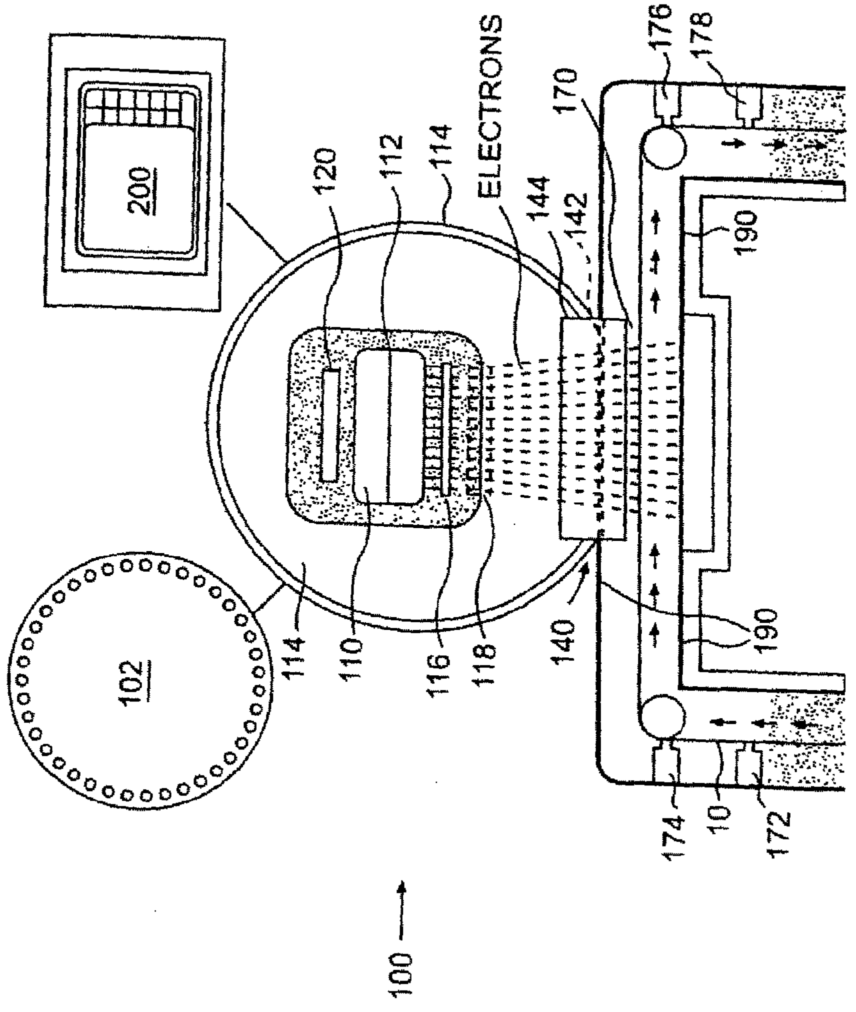
FIG. 1 is a schematic view of the particle beam processing device according to one embodiment of the present invention.

One embodiment of the present invention provides a layered material, e.g., a material having two or more layers. The material can be curable by exposure to highly accelerated particles, such as an electron beam. Further, the layered material can comprise:

a substrate;

an ink formulation on at least a portion of the substrate, the ink formulation comprising ink and at least one monomer curable by free radical and/or cationic polymerization; and a lacquer on at least a portion of the ink formulation, the lacquer comprising at least one monomer curable by free radical and/or cationic polymerization.

In one embodiment, any type of monomer curable by free radical and/or cationic type polymerization mechanisms can be useful in the invention provided that the ink physical properties like viscosity, appearance etc. do not render it unusable by the conventional application methods. In one embodiment, the ink formulation and lacquer comprise at least one monomer independently selected from acrylate esters, vinyl ethers, cycloaliphatic diepoxides, and polyols.

In one embodiment, the ink formulation and lacquer comprise monomers that can be cured, e.g., polymerized, upon exposure to highly accelerated particles, such as electrons generated by a particle beam. The polymerization can occur within the individual layers, e.g., ink formulation and lacquer, such that the polymers formed can cause the layers to be bonded to each other. In one embodiment, polymerization occurs between the layers forming, for example, an interpenetrating network. Alternatively, crosslinks can be formed between the ink formulation and the lacquer.

"At least one monomer," as used herein, refers to one or a combination of two or more monomers.

In one embodiment, the lacquer coats a portion of the ink formulation. In another embodiment, the lacquer coats the entire ink formulation printed on the substrate. In yet another embodiment, the lacquer coats the ink formulation and substrate surface, such as the entire ink formulation and the portion of the substrate surface that is not printed with the ink formulation.

Because both the ink formulation and the lacquer comprise monomer components that can be cured, such as by an EB process, the resulting cured product can result in the ink being cohesive and/or integrated with the lacquer. Accordingly, in the cured product, the ink can have good adhesion to the lacquer. In one embodiment, good adhesion can be determined by exposing the cured, printed material to a standard T-peel test or tape adhesion test. For example, where the lacquer coats a portion of the printed ink formulation/substrate surface, the adhesion is tested with a tape adhesion test. In another example, where the lacquer coats the entire surface of the printed ink formulation/substrate surface, e.g., as in a laminating adhesive, the adhesion is tested with a T-peel test.

Another embodiment of the present invention provides the cured product, e.g., a layered material, comprising:

a substrate;

an ink formulation on at least a portion of the substrate, the ink formulation comprising ink and at least one first polymer; and a lacquer on at least a portion of the ink formulation, the lacquer comprising at least one second polymer, wherein the at least one first polymer is bonded to the at least one second polymer.

In one embodiment, at least a portion of the at least one first polymer is bonded to at least a portion of the at least one second polymer. For example, the polymers can be surface-bonded to each other. Alternatively, at least portion of the first polymer, i.e., in the ink formulation, can penetrate into the second polymer.

In one embodiment, the at least one first polymer is adhered, for example, like an adhesive, to the at least one second polymer.

In one embodiment, the at least one first polymer is chemically bonded to the at least one first polymer. In one embodiment, "chemically bonded" refers to covalent bonds formed between at least a portion of each of the polymers. In one embodiment, an interpenetrating network of chemical bonds exist throughout the ink formulation/lacquer structure. In another embodiment, crosslinks may form between the first polymer in the ink formulation, and the second polymer in the lacquer.

In one embodiment, the ink formulation and lacquer may comprise polymers derived from at least one monomer selected from acrylate esters including multifunctional acrylates for free radical polymerization, and vinyl ethers, cycloaliphatic diepoxides, and polyol for cationic polymerization. The phrase "polymers derived from at least one monomer selected from," as used herein, means polymers derived from one or more monomers to form homopolymers or copolymers.

In one embodiment, the lacquer and ink formulation comprise monomers selected from acrylate esters, and the polymerization is a free radical polymerization. In another embodiment, the lacquer and ink formulation comprise monomers selected from cycloaliphatic diepoxide and polyol and the polymerization is a cationic polymerization.

In one embodiment, the ink formulation or lacquer can comprise monomers such as a multifunctional acrylate ester. Exemplary multifunctional acrylate esters include:

acrylated polyols having a molecular weight ranging from 150 to 600;

polyester acrylates having a molecular weight ranging from 1000 to 2000;

polyether acrylates having a molecular weight ranging from 200 to 1500;

polyester urethane acrylates having a molecular weight ranging from 400 to 2000;

polyurea acrylates having a molecular weight ranging from 400 to 2000; and epoxy acrylates having a molecular weight ranging from 300 to 1000.

Specific examples of the multifunctional acrylate may include pentaerythritol tetraacrylate, ditrimethylol propane tetraacrylate, trimethylolpropane triacrylate, glycerol triacrylate, triacrylate ester of tris(2-hydroxyethyl)isocyanurate, hexanediol diacrylate, dipentaerythritol hexacrylate, and ethoxylated and propoxylated derivatives thereof.

The lacquer can serve at least one of several purposes, including protecting the ink from smearing and scratching. The lacquer can also provide sufficient traction to enable the material to run through the EB machine. For aesthetic reasons, the lacquer can be used to create a high gloss finish for the packaged product.

In one embodiment, the lacquer is an over-print varnish (OPV).

The lacquer may also include wetting agents, defoamers, and other additives, such as waxes, to control the coefficient of friction (COF) and import desired functional properties, such as gas and aroma barrier properties.

The lacquer may have a normalized thickness (expressed in terms of its mass density) ranging from 0.5 to 20 $g/m^2$. In one embodiment, the lacquer has a thickness ranging from 1 to 10 $g/m^2$, such as a thickness ranging from 2 to 5 $g/m^2$.

In one embodiment, the ink formulation comprises well known flexography inks, including solvent based, water based, and electron beam curable ink, such as Unicure™, available from Sun Chemicals Ink of Northlake, Ill. In one embodiment, rotogravure printing inks can be used.

In one embodiment, the substrate comprises at least one polymer, such as thermoplastics. In another embodiment, the substrate comprises at least one polymer selected from:

polyolefins, including oriented polypropylene (OPP), cast polypropylene, polyethylene and polyethylene copolymer;

polyolefin copolymers, including ethylene vinyl acetate, ethylene acrylic acid and ethylene vinyl alcohol (EVOH), polyvinyl alcohol and copolymers thereof;

polystyrene;

polyesters, including polyethylene terephthalate (PET), or polyethylene naphthalate (PEN);

polyamides, including nylon, and MXD6;

polyimides;

polyacrylonitrile;

polyvinylchloride;

polyvinyl dichloride;

polyvinylidene chloride;

polyacrylates; ionomers;

polysaccharides, including regenerated cellulose;

silicone, including rubbers or sealants;

natural and synthetic rubbers.

In one embodiment, the substrate comprises at least one material selected from:

polysaccharides, including regenerated cellulose;

glassine or clay coated paper;

paper board, such as SBS polycoated paper; and

Kraft paper.

In one embodiment, the substrate comprises metallized films and vapor deposited metal oxide coated polymer films, including $AlO_x$, $SiO_x$, and $TiO_x$, and OPP, PET, and PE $ALO_x$ coated films, $SiO_x$ coated OPP, and metallized PET films. For example, a metallization process can be a vacuum deposition process with an aluminum oxide. Here, the aluminum is heated to above melting temperature under a vacuum condition in a chamber. A continuous web is run through the vacuum chamber filled with molten aluminum via a series of rollers. Under a controlled condition, the molten aluminum is deposited on either one or both of its surfaces creating a precise thickness of aluminum metallization on the web. This metallization can be seen, for example, as the shiny silver-colored coating on the inner side of a bag of potato chips.

In one embodiment, the substrate has a thickness sufficient to provide desired strength to the packaging and to maintain quality of the contents of a packaged product, such as a thickness ranging from 10 to 200 $g/m^2$, or a thickness ranging from 30 to 90 $g/m^2$, or ranging from 50 to 70 $g/m^2$. In another embodiment, the substrate may have a thickness ranging from 100 to 1000 Angstroms.

The source of the highly accelerated electrons can be a particle beam processing device. In one embodiment, the ink formulation and lacquer are curable by exposure to highly accelerated particles generated by a particle beam processing device operating at a voltage of 125 kVolts or less, such as a voltage of 110 kVolts or less. In another embodiment, the highly accelerated particles emit energy ranging from 0.5 Mrads to 10 Mrads.

In one embodiment, the particles can be accelerated to an extent sufficient to cure the lacquer and ink formulation almost instantaneously or within approximately a few milliseconds. For the manufacturers of consumer food products, like chocolate bars, potato chips, candies, dried fruits, etc., where mass quantity production is desired, this can be a useful process since products can be quickly packaged and shipped to suppliers and consumers.

Another embodiment of the present invention provides a method for making a layered material, comprising:

providing a substrate;

applying an ink formulation on at least a portion of the substrate, the ink formulation comprising ink and at least one monomer selected from acrylate esters, vinyl ethers, cycloaliphatic diepoxides, and polyols; and applying a lacquer on at least a portion of the ink formulation, the lacquer comprising at least one monomer selected from acrylate esters, vinyl ethers, cycloaliphatic diepoxides, and polyols.

In one embodiment, the ink formulation is applied by at least on method selected from flexography printing, rotorgravure printing, offset lithography printing, and spray printing. In another embodiment, the ink formulation is applied as a label print.

In one embodiment, the lacquer is applied by at least one method selected from a roll coating application, an offset gravure application, and a direct gravure application.

In one embodiment, the method comprises exposing the ink formulation and lacquer to highly accelerated particles generated by a particle beam processing device operating at a voltage of 125 kVolts or less, such as a voltage of 110 kVolts or less. The particles can be accelerated to an extent sufficient to cause polymerization of the monomers in the ink formulation and the lacquer. In one embodiment, the highly accelerated particles emit electron doses energy ranging from 0.5 Mrads to 10 Mrads.

In one embodiment, the lacquer is treated by using an EB machine having a power supply and operating at a voltage of 125 kVolts or less, such as a voltage of 110 kVolts or less. In one embodiment, the operating voltage of the EB machine may range from 60 to 110 kVolts, such as an operating voltage ranging from 70 to 110 kVolts, or from 90 to 110 kVolts.

In one embodiment, the EB machine generates electrons emitting energy ranging from 0.5 to 10 Mrads to cure the lacquer and ink formulation. In one embodiment, the emitted electron energy ranges from 1 to 7 Mrads, such as energy ranging from 2 to 5 Mrads.

In one embodiment, the lacquer is a laminating adhesive for laminating two substrates together where the lacquer covers the entire surface of the substrate and printed ink formulation—e.g. two plastic films, paper or paperboard laminated to plastic film. For example, the layered material can comprise a substrate, an ink formulation on the substrate and a lacquer on the entire ink/substrate surface. A second substrate, such as a thermoplastic film, can then be positioned on the lacquer, e.g., nipped with the first substrate.

One example of a particle beam processing device for providing highly accelerated particles is described in U.S. Patent Publication No. 2003/0001108. This device can be made relatively small in size and to operate at lower voltages and high efficiency. FIG. 1 schematically illustrates a particle beam processing device 100, including power supply 102, particle beam generating assembly 110, foil support assembly 140, and processing assembly 170. Power supply 102 can provide an operating voltage of 110 kVolts or less, such as a range of 90-100 kVolts, to the processing device 100. Power supply 102 may be of a commercially available type that includes multiple electrical transformers located in an electrically insulated steel chamber to provide high voltage to particle beam generating assembly 110.

Particle beam generating assembly 110 can be kept in a vacuum environment of vessel or chamber 114. In an EB processing device, particle generating assembly 110 is commonly referred to as an electron gun assembly. Evacuated chamber 114 may be constructed of a tightly sealed vessel in which particles, such as electrons, are generated. Vacuum pump 212 can be provided to create a vacuum environment in the order of approximately $10^{-6}$ Torr, or other vacuum conditions as needed. Inside the vacuum environment of chamber 114, a cloud of electrons are generated around filament 112 when high-voltage power supply 102 sends electrical power to heat up filament 112

With sufficient heating, filament 112 glows white hot and generates a cloud of electrons. Electrons are then drawn from filament 112 to areas of higher voltage, because electrons are negatively charged particles and accelerated to extremely high speeds. Filament 112 may be constructed of one or more wires commonly made of tungsten, where two or more wires may be configured to be spaced evenly across the length of foil support 144 and emits electron beams across the width of a substrate 10.

Figure 2:
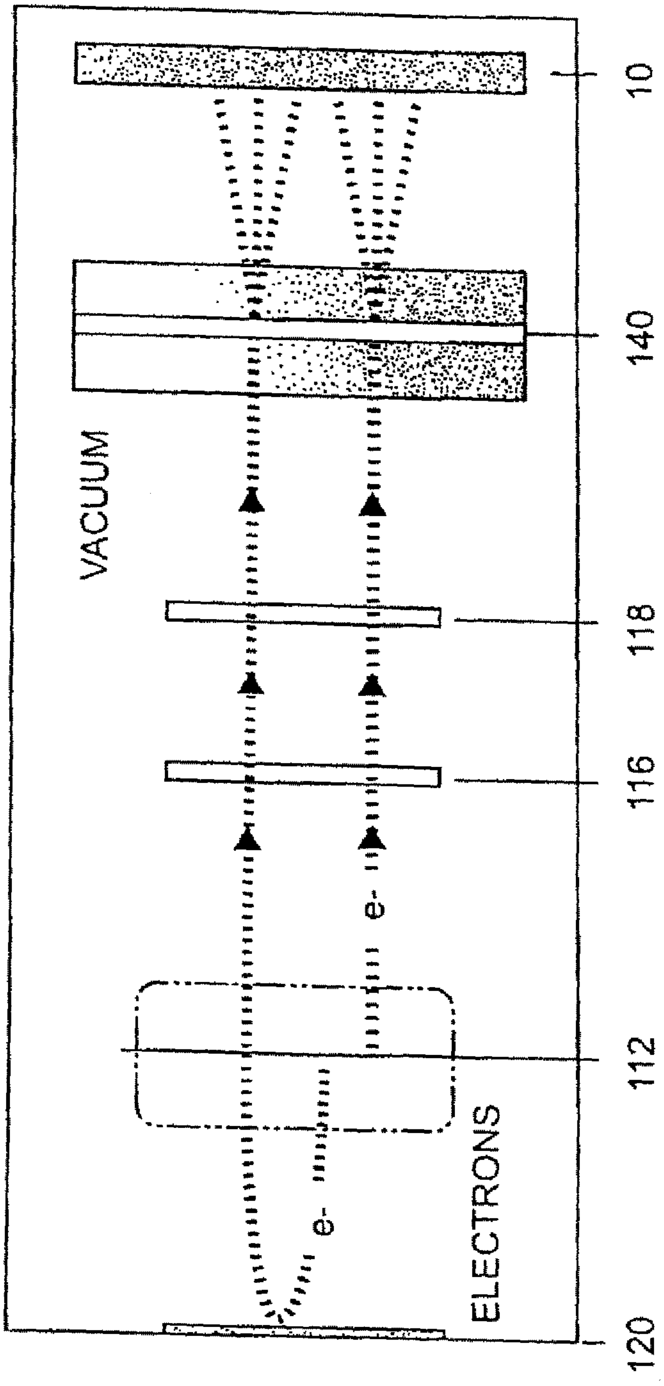
FIG. 2 is a schematic view of a voltage profile of an electron beam.

As shown in FIGS. 1 and 2, particle beam generating assembly 110 may include an extractor grid 116, a terminal grid 118, and a repeller plate 120. Repeller plate 120 repels electrons and sends the electrons toward extractor grid 116. Repeller plate 120 operates at a different voltage, such as a slightly lower voltage, than filament 112 to collect and redirect electrons escaping from filament 112 away from the electron beam direction as shown in FIG. 2.

Extractor grid 116, operating at a slightly different voltage, such as a voltage higher than filament 112, attracts electrons away from filament 112 and guides them toward terminal grid 118. Extractor grid 116 controls the quantity of electrons being drawn from the cloud, which determines the intensity of the electron beam.

Terminal grid 118, operating generally at the same voltage as extractor grid 116, acts as the final gateway for electrons before they accelerate to extremely high speeds for passage through foil support assembly 140.

Filament 112 may operate at −110,000 Volts (i.e. 110 kV) and foil support assembly 140 may be grounded or set at 0 Volt. Repeller plate 120 may be selected to operate at −110,010 Volts to repel any electrons towards filament 112. Extractor grid 116 and terminal grid 118 may be selected to operate in a range of −110,000 Volts to −109,700 Volts.

The electrons then exit vacuum chamber 114 and enter the foil support assembly 140 through a thin foil 142 to penetrate a coated material or substrate 10 to cause a chemical reaction, such as polymerization, crosslinking, or sterilization. The speed of the electrons may be as high as or above 100,000 miles per second. Foil support assembly 140 may be made up of a series of parallel copper ribs (not shown). Thin foil 142, as shown in FIG. 1, is securely clamped to the outside of foil support assembly 144 to ensure a leak-proof vacuum seal inside chamber 114. High speed electrons pass freely between the copper ribs, through thin foil 142 and into substrate 10 being treated. To prevent an undue energy loss, the foil can be made as thin as possible while at the same time providing sufficient mechanical strength to withstand the pressure differential between the vacuum state inside particle generating assembly 110 and processing assembly 170.

The particle beam generating device can be made smaller in size and operate at a higher efficiency level when the thin foil of the foil support assembly is made of titanium or alloys thereof and has a thickness of 10 μm or less, such as a thickness ranging from 3-10 μm or ranging from 5-8 μm. Alternatively, thin foil 142 may also be constructed of aluminum or alloys thereof having a thickness of 20 μm or less, such as a thickness ranging from 6-20 μm, or ranging from 10-16 μm.

Once the electrons exit the foil support assembly 140, they enter the processing assembly 170 where the electrons penetrate a coating, layer, web, or substrate 10 and cause a chemical reaction resulting in polymerization, crosslinking or sterilization. The product being EB treated can be transformed instantaneously, may need no drying or cooling, and may contain new and/or desirable physical properties. Products can be shipped immediately after processing.

In operation, particle beam processing device 100 works as follows. A vacuum pump 212 evacuates air from chamber 114 to achieve a vacuum, such as a vacuum of approximately $10^{-6}$ Torr, at which point processing device 100 is fully operational. In particle generating assembly 110, particle gun assembly components, including repeller plate 120, extractor grid 116, and terminal grid 118, are set at three independently controlled voltages which initiate the emission of electrons and guide their passage through foil support 144.

During the particle beam processing, a combination of electric fields inside evacuated chamber 114 create a "push/pull" effect that guides and accelerates the electrons toward thin foil 142 of foil support 144, which is typically at ground (0) potential. The quantity of electrons generated is directly related to the voltage of extractor grid 116. At slow production speeds, extractor grid 116 is set at a lower voltage than at high speeds, when greater voltage is applied. As the voltage of extractor grid 116 increases, so does the quantity of electrons being drawn from filament 112.

The materials to be cured, for example, lacquer, ink formulations, and coatings, generally require a low oxygen environment to cause the chemical conversion from a liquid state into a solid state. The particle beam processing device according to this invention may include, as illustrated in FIG. 1, a plurality of nozzles 172, 174, 176, and 178 distributed in processing zone 170 to inject gas other than oxygen, such as an inert gas, to displace the oxygen therein. In one embodiment, nitrogen gas is selected to be pumped into processing zone 170 through nozzles 172, 174, 176, and 178 to displace the oxygen that would prevent complete curing.

Process control system 200 may be set to provide a desired depth level of cure on a substrate or coating, which can allow particle beam processing device 100 to be calibrated to high precision specification. Process control system 200 can calculate the dose and the depth of electron penetration into the coating or substrate. The higher the voltage, the greater the electron speed and resultant penetration.

Dose is the energy absorbed per unit mass and is measured in terms of megarads (Mrad), which is equivalent to 2.4 calories per gram. A higher number of electrons absorbed reflects a higher dose value. In application, dose is commonly determined by the material of the coating and the depth of substrate to be cured. For example, a dose of 5 Mrad may be required to cure a coating on a substrate that is made of rice paper and having a mass density of 20 gram/m$^2$. Dose is directly proportional to the operating beam current which is the number of electrons extracted, and inversely proportional to the feed speed of the substrate, as expressed by the following formula:

$$Dose=K\cdot(I/S)$$

wherein I is the current measured in mAmp, S is the feed speed of the substrate measured in feet/min, and K is a proportionality constant which represents a machine yield of the processing device, or the output efficiency of that particular processing device.

Application of the particle beam processing device made according to this invention can be found in many industries including, for example, packaging, insulation films, reflective coatings and reflective materials, solar films, etc. Other fields, such as outer space suits and aircrafts, may also find this invention useful. For exemplary purposes only, an embodiment of the present invention is discussed with respect to an application of the particle beam processing device in the flexible food packaging field.

Example 1

This Example provides a comparison of adhesion of an ink formulation without monomers (Ink 1) versus ink formulations comprising monomers at various concentrations (Ink 2, 3, and 4).

Ink 1

10 grams of ink (Aqua Sun Cyan R3271-48B), as received from Sun Chemicals, was placed in a 250 ml beaker.

Ink 2

10 grams of ink (Aqua Sun Cyan R3271-48B), as received from Sun Chemicals, was placed in a 250 ml beaker. 0.25 grams of polyethylene glycol 200 diacrylate (PEG-200 SR-259, Sartomer) was added to the beaker with stirring at room temperature, for a monomer concentration of 2.5%. There were no signs of phase separation or incompatibility between the monomer and ink.

Ink 3

10 grams of ink (Aqua Sun Cyan R3271-48B), as received from Sun Chemicals, was placed in a 250 ml beaker. 0.50 grams of polyethylene glycol 200 diacrylate (PEG-200 SR-259) was added to the beaker with stirring at room temperature, for a monomer concentration of 5%. There were no signs of phase separation or incompatibility.

Ink 4

10 grams of ink (Aqua Sun Cyan R327-148B), as received from Sun Chemicals was taken in a 250 ml beaker. 1.0 grams of polyethylene glycol 200 diacrylate (PEG-200 SR-259) was added to the beaker with stirring at room temperature, for a monomer concentration of 10%. There were no signs of phase separation or incompatibility.

Film Preparation

Eight 10"×10" sheets of CEQW™ oriented polypropylene (OPP) film (Vifan Americas) having a thickness of 25 μm were provided. To the treated side of the OPP having a surface tension of 40 dynes\cm, Inks 1-4 from above were applied by a roll method. The coated films were dried in an oven at 110° C. until the inks were dry to touch.

For Sample Nos. 1-4, the films were each coated with thermally dried Inks 1-4, followed by coating with an EB curable overprint varnish (EB1044-E, Sovereign Specialty Chemicals). The coating was applied with a Myer rod at a coat weight of about 5 g/m$^2$.

For Sample Nos. 4-8, the films were each coated with thermally dried Inks 1-4, followed by coating with an EB curable overprint varnish (EBL010-2, Virkler chemicals). The coating was applied with a Myer rod at a coat weight of about 5 g/m$^2$.

Sample Nos. 1-8 were then cured with an ESI EB unit operating at 110 kV and 3 Mrads at a line speed of 10 m/min and at an oxygen concentration of <150 ppm.

The overprint varnish for all the samples was cured upon EB irradiation. Adhesion of the overprint varnish was then tested by the above referenced scotch tape test. The results are shown in Table I, below:

TABLE I

| Sample No. | ink | Monomer conc. in ink | EB OverPrint Varnish | Adhesion |
|---|---|---|---|---|
| 1 | Ink #1 | 0% | EB1044-E | Slight ink removal |
| 2 | Ink #2 | 2.5% | EB1044-E | Excellent |
| 3 | Ink #3 | 5% | EB1044-E | Excellent |
| 4 | Ink #4 | 10% | EB1044-E | Excellent |
| 5 | Ink #1 | 0% | EBLO 10-2 | Spotty ink removal & ink split |
| 6 | Ink #2 | 2.5% | EBLO 10-2 | Excellent |
| 7 | Ink #3 | 5% | EBLO 10-2 | Excellent |
| 8 | Ink #4 | 10% | EBLO 10-2 | Excellent |

This Example demonstrates that the addition of an energy curable monomer like PEG-200 diacrylate in the ink improves ink cohesiveness and the adhesion to the overprint varnish.

The addition of the monomer in amounts as little as 2.5% by weight of the as received ink is useful in improving ink adhesion and cohesiveness.

Example 2

This Example describes the preparation of a film with a solvent-based ink.

10 g of as received MOD Sealtech F-11 blue solvent based ink (Color Converting) was placed in a 250 mL beaker. To this ink, 0.5 g of 1,6-hexanedioldiacrylate (HDDA, Sartormer Chemicals) was added with stirring. The HDDA went into solution with no indication of phase separation. The beaker was covered with a layer of 1.0 mil aluminum foil and allowed to stand overnight at room temperature. No phase separation or increase in viscosity was observed for the ink+HDDA formulation.

Sample 9

A 48 gauge acrylic coated PET film was coated with the ink+HDDA formulation by a hand roller method. The film was air-dried. An EB OPV (Sovereign Specialty Chemicals EB 1044-E) was coated on the dried ink. The OPV was EB treated at 110 kV and 3 Mrads under inert conditions.

The coating cured well on the ink. It was then subjected to a Scotch tape and 3M 610 tape test. The ink and the coating adhered very well to the film substrate.

Example 3

This Example demonstrates the value of an electron beam curable monomer added to a conventional water based ink used for laminating adhesives.

A typical laminate used in the flexible food packaging industry is of the type as shown in Table II below.

TABLE II

| | |
|---|---|
| TOP FILM 0.5 mil polyester (PET): | 17.0 grams\m$^2$ |
| Ink (Solvent or water based): | 3.0 grams\m$^2$ |
| EB curable laminating adhesive (lacquer): | 3.0 grams\m$^2$ |
| Sealant of Polyethylene copolymer (PE): | 40.0 grams\m$^2$ |

Sample 10

Ink 1 from Example 1 was applied to a 48 gauge acrylic coated PET film by the roller method. The film was then air dried. An EB laminating adhesive (#76R, Liofol) was applied to the dry ink by a Myer rod at a coat weight of about 3.0 g/m$^2$. The bottom film, comprising 175 gauge polyethylene (Pliant) was then laminated to it. The EB adhesive was cured using ESI EB unit operating at 110 kV and 3 Mrads of dose with the PET film exposed to the beam.

Sample 11

Ink 3 from Example 1 was applied to a 48 gauge acrylic coated PET film by the roller method. The film was then air dried. An EB laminating adhesive (#76R, Liofol) was applied to the dry ink by a Myer rod at a coat weight of about 3.0 g/m$^2$. The bottom film, comprising 175 gauge polyethylene (Pliant) was then laminated to it. The EB adhesive was cured using ESI EB unit operating at 110 kV and 3 Mrads of dose with the PET film exposed to the beam.

The EB adhesive in either case cured very well. For both Samples 10 and 11, the adhesion of the PET to the PE for clear (non ink) areas was good. However, adhesion between the films in the ink areas was not as good for the laminate prepared by Sample 10 when compared to the laminate prepared in Sample 11.

The laminate prepared from Sample 10 was ink split. The laminate prepared from Sample 11 presented more cohesiveness in the ink because of the addition of EB monomer (PEG-200 diacryate) added to the water-based ink.

The electrons cured the adhesive as well as the ink in Sample 11 providing the ink the necessary cohesiveness obtained by cross-linking.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for making a layered material, comprising:

providing a substrate;

applying an ink formulation on at least a portion of the substrate, the ink formulation comprising an ink and at least one energy-curable monomer selected from acrylates, vinyl ethers, and cycloaliphatic diepoxides, wherein said ink is selected from air-dryable and thermally-dryable inks;

drying the ink formulation, wherein said drying is not achieved by exposure to energy-curing radiation;

applying a lacquer on at least a portion of the ink formulation, the lacquer comprising at least one energy-curable monomer selected from acrylates, vinyl ethers, and cycloaliphatic diepoxides, wherein at least a portion of said ink formulation and at least a portion of said lacquer are selected to permit at least some chemical bonding to each other, and wherein the acrylate in the ink formulation and/or lacquer is a multifunctional acrylate ester selected from acrylated polyols having a molecular weight ranging from 150 to 600; polyester acrylates having a molecular weight ranging from 1000 to 2000; polyether acrylates having a molecular weight ranging from 200 to 1500; polyester urethane acrylates having a molecular weight ranging from 400 to 2000; polyurea acrylates having a molecular weight ranging from 400 to 2000; and epoxy acrylates having a molecular weight ranging from 300 to 1000;

and exposing the ink formulation and lacquer to an electron beam that causes polymerization of the monomers in the ink formulation and the lacquer.

2. A method for making a layered material, comprising:

providing a substrate;

applying an ink formulation on at least a portion of the substrate, the ink formulation comprising an ink and at least one energy-curable monomer selected from acrylates, vinyl ethers, and cycloaliphatic diepoxides, wherein said ink is selected from air-dryable and thermally-dryable inks;

drying the ink formulation, wherein said drying is not achieved by exposure to energy-curing radiation;

applying a lacquer on at least a portion of the ink formulation, the lacquer comprising at least one energy-curable monomer selected from acrylates, vinyl ethers, and cycloaliphatic diepoxides, wherein at least a portion of said ink formulation and at least a portion of said lacquer are selected to permit at least some chemical bonding to each other, and wherein the acrylate in the ink formulation and/or lacquer is a multifunctional acrylate ester selected from pentaerythritol tetraacrylate, ditrimethylolpropane tetraacrylate, trimethylolpropane triacrylate, glycerol triacrylate, triacrylate ester of tris(2-hydroxy-ethyl) isocyanurate, hexanediol diacrylate, dipentaerythritol hexacrylate, and ethoxylated and propoxylated derivatives thereof;

and exposing the ink formulation and lacquer to an electron beam that causes polymerization of the monomers in the ink formulation and the lacquer.

3. The method according to claim 1 or 2, wherein the electron beam is generated by a particle beam processing device operating at a voltage of 125 kVolts or less.

4. The method according to claim 1 or 2, wherein the electron beam is generated by a particle beam processing device operating at a voltage of 110 kVolts or less.

5. The method according to claim 1 or 2, wherein the electron beam emits an energy ranging from 0.5 Mrads to 10 Mrads.

6. The method according to claim 1 or 2, wherein the polymerization is a free radical polymerization.

7. The method according to claim 1 or 2, wherein the lacquer and ink formulation comprise monomers selected from acrylates.

8. The method according to claim 1 or 2, wherein the ink formulation is applied by at least one method selected from flexography printing, rotor-gravure printing, offset lithography printing, and spray printing.

9. The method according to claim 1 or 2, wherein the lacquer is applied by at least one method selected from a roll coating application, an offset gravure application, and a direct gravure application.

10. The method according to claim 1 or 2, wherein the substrate comprises at least one polymer selected from polyolefins, polyolefin copolymers, polystyrene, polyesters, polyamides, polyimides, polyacrylonitrile, polyvinylchloride, polyvinyl dichloride, polyvinylidene chloride, polyacrylates, ionomers, polysaccharides, silicones, natural rubbers, and synthetic rubbers.

11. The method according to claim 1 or 2, wherein the lacquer has a normalized thickness ranging from 0.5 $g/m^2$ to 20 $g/m^2$.

12. The method according to claim 1 or 2, wherein the lacquer coats at least a portion of the ink formulation and the substrate surface.

13. The method according to claim 1 or 2, further comprising a second substrate positioned on the lacquer.

14. The method according to claim 1 or 2, wherein the chemical bonding is covalent.

15. The method according to claim 1 or 2, wherein the chemical bonding is cross-linking.

16. The method according to claim 1 or 2, wherein the ink is selected from solvent and/or water-based inks.

17. The method according to claim 1 or 2, wherein the ink formulation comprises greater than 0% by weight to about 10% by weight of at least one energy-curable monomer selected from acrylates, vinyl ethers, and cycloaliphatic diepoxides.

* * * * *